(12) United States Patent
Billig et al.

(10) Patent No.: US 8,290,626 B2
(45) Date of Patent: Oct. 16, 2012

(54) CHEMICAL PROCESS OPTIMIZATION METHOD THAT CONSIDERS CHEMICAL PROCESS PLANT SAFETY

(75) Inventors: Barry Billig, Irvington, NY (US); John James Sullivan, Wayne, NJ (US)

(73) Assignee: SD Lizenzverwertungsgesellschadt mbH & Co KG, Munich (DE)

( * ) Notice: Subject to any disclaimer, the term of this patent is extended or adjusted under 35 U.S.C. 154(b) by 1150 days.

(21) Appl. No.: 11/852,713

(22) Filed: Sep. 10, 2007

(65) Prior Publication Data

US 2009/0069944 A1 Mar. 12, 2009

(51) Int. Cl.
*G05B 21/00* (2006.01)

(52) U.S. Cl. ....................................................... 700/268

(58) Field of Classification Search .................... 700/268
See application file for complete search history.

(56) References Cited

U.S. PATENT DOCUMENTS

| 5,229,075 | A * | 7/1993 | Fauske ........................... 422/130 |
| 7,153,985 | B1 | 12/2006 | Gary et al. |
| 2004/0236124 | A1 | 11/2004 | Evans et al. |
| 2007/0203379 | A1 * | 8/2007 | Bolk et al. ..................... 585/500 |

FOREIGN PATENT DOCUMENTS

WO W02004092148 10/2004

OTHER PUBLICATIONS

Crowl, D.A.; Elwell, T.I. "Identifying criteria to classify chemical mixtures as "highly hazardous" due to chemical reactivity." Journal of Loss Prevention in the Process Industries, 2004, 17, pp. 279-289.*
Author Unknown. "Separations and Reaction Engineering: Design Project. Ethylene Production." http://web.archive.org/web/20040106023514/www.che.cemr.wvu.edu/publications/projects/ethylene/eo-d.pdf. Internet Archival Date: Oct. 23, 2004, pp. 1-13.*
Melhem, G. A.; Gianetto, A.; Levin, M. E.; Fisher, H. G.; Chippett, S.; Singh, S. K.; Chipman, P. I. "Kinetics of the Reactions of Ethylene Oxide with water and Ethylene Glycols." Process Safety Progress, 2001, vol. 20, No. 4, pp. 231-246.*
Authoer Unknown. Industrial Practices. http://web.archive.org/web/20021231125452/http://www.che.lsu.edu/COURSES/4205/2000/Farritor/IndustrialPractices.html. Internet Archival Date: Dec. 31, 2002. pp. 1-2.*
Darby, R."Relief Vent Sizing for Deflagrations." Process Safety Progress, 2006, vol. 25, No. 2, pp. 130-134.*
Teranishi, Hiroshi, "Studies onthe Explosions Under High Presser, V, The Explosions of Ethylene mixed with Oxygen" In the Review of Physical Chemistry of Japan, 1959, Volo. 29, No. 1, p. 30-37.

* cited by examiner

*Primary Examiner* — Bobby Ramdhanie
(74) *Attorney, Agent, or Firm* — Scully, Scott, Murphy & Presser, P.C.

(57) ABSTRACT

A method for assuring safety of a particular chemical process plant includes measuring, for each of a plurality of sets of proposed process conditions for a particular chemical process within the particular chemical process plant, a pressure rise rate following a deliberate contained ignition of at least one material used within the particular chemical process. From the resulting plurality of pressure rise rates that corresponds with the plurality of sets of proposed process conditions a particular pressure rise rate that allows for a safe operation of the particular chemical reaction within the particular chemical process plant may be selected. The particular chemical process may be implemented within the particular chemical process plant while using a particular set of process conditions from the plurality of sets of process conditions that corresponds with the selected pressure rise rate. As an adjunct, the particular chemical reaction may also be subsequently and additionally optimized with respect to an ancillary parameter, such as product yield or feedstock utilization.

19 Claims, 2 Drawing Sheets

CHEMICAL PROCESS OPTIMIZATION METHOD THAT CONSIDERS CHEMICAL PROCESS PLANT SAFETY

BACKGROUND

1. Field of the Invention

The invention relates generally to chemical process optimization. More particularly, the invention relates to chemical process optimization while considering chemical process plant safety.

2. Description of the Related Art

Many industrial chemicals are produced in generally large volumes (i.e., thousands of tons per year) while using chemical process plants. Chemical process plants may be used for producing organic chemicals (i.e., including petrochemicals), as well as inorganic chemicals. Chemical process plants may in general be used for producing chemicals within either a batch processing mode (i.e., a batch processing using a batch chemical process reactor) or alternatively a continuous processing mode (i.e., a continuous processing using a continuous chemical process reactor).

When producing chemicals in general, and when producing organic chemicals more particularly, it is common in the chemical processing art to react a chemical reactant material under elevated conditions of temperature and pressure to facilitate an efficient chemical reaction of the chemical reactant material to a desirable chemical product material. In many chemical reactions, at least one of a chemical reactant material and a resulting chemical product material may be chemically unstable (i.e., readily prone to a chemical reaction). The presence of at least one of a chemically unstable chemical reactant material and a chemically unstable chemical product material within a chemical reactor may lead to safety considerations within a chemical process plant within which the chemical reactant material is reacted to produce the chemical product material. As a non-limiting example, olefin oxidation reactions (i.e., olefin epoxidation reactions), such as a reaction of ethylene and oxygen to produce ethylene oxide, are particularly susceptible to flammability due to the presence of an oxidation prone organic chemical reactant material (i.e., an olefin) in the presence of an oxidant (i.e., oxygen).

As background, various aspects of ethylene oxide production incident to reaction of ethylene and oxygen at elevated temperature and elevated pressure within a chemical process plant are known in the chemical process art.

For example, Evans et al., in U.S. Pat. No. 6,372,925, World Pub. No. WO/2004/092148 and U.S. Pub. No. 2004/0236124, teaches a chemical process for production of ethylene oxide by reaction of ethylene and oxygen, while considering an aging effect of a selective silver catalyst that is used within the chemical process. Due to consideration of the aging effect of the selective silver catalyst, the chemical process provides for using different reaction temperatures and different ethylene oxide chemical reactant concentrations before and after aging of the selective silver catalyst that is used within the chemical process.

In addition, Gary et al., in U.S. Pat. No. 7,153,985, teaches a chemical process for producing ethylene oxide by reaction of ethylene and oxygen, while avoiding a post-ignition condition within a chemical process plant within which is undertaken the chemical process. The post-ignition condition within the chemical process plant is avoided in-part by monitoring a concentration of hydrocarbons having at least four carbon atoms within the chemical process plant as an indication of susceptibility of the chemical process plant to the post-ignition condition.

Chemical process plant safety is likely to continue to be of considerable importance within the context of implementation of new and existing chemical processes within chemical process plants. To that end, desirable are general methods that may be used to assure chemical process plant safety when implementing new or existing chemical processes within the chemical process plants.

SUMMARY

The invention provides a method for safely operating a chemical process plant (i.e., typically including a chemical reactor) when implementing a chemical process within the chemical process plant (i.e., typically including in particular implementing the chemical process within the chemical reactor). The method is predicated upon measurement of a pressure rise rate within a containment vessel after deliberate ignition within the containment vessel of at least one material that is used within the chemical process. A plurality of measurements of the foregoing pressure rise rate within the containment vessel is undertaken for a plurality of sets of proposed chemical process conditions. The deliberate ignitions for the plurality of sets of proposed chemical process conditions is typically (although not necessarily) undertaken in a test apparatus containment vessel separate from the chemical process plant. The invention contemplates that when implementing the particular chemical process within the particular chemical process plant, there is selected one of the plurality of sets of proposed chemical process conditions for safe operation of the chemical process plant predicated upon a pressure rise rate within the containment vessel that provides for safe operation of the chemical process plant.

A particular method for safely operating a chemical process plant in accordance with the invention includes measuring, for each of a plurality of sets of proposed process conditions for a particular chemical process within a particular chemical process plant, a pressure rise rate following a deliberate contained ignition of at least one material within the particular chemical process. The foregoing measuring thus provides a plurality of pressure rise rates that corresponds with the plurality of sets of proposed process conditions. This particular method also includes selecting from the plurality of pressure rise rates a particular pressure rise rate that allows for a safe operation of the particular chemical process within the particular chemical process plant. This particular method also includes implementing the particular chemical process within the particular chemical process plant while using a particular set of process conditions from the plurality of sets of process conditions that corresponds with the particular pressure rise rate from the plurality of pressure rise rates.

Another particular method for safely operating a chemical process plant in accordance with the invention also includes measuring, for each of a plurality of sets of proposed process conditions for a particular chemical process within a particular chemical process plant, a pressure rise rate following a deliberate contained ignition of at least one material within the particular chemical process. The foregoing measuring thus also provides a plurality of pressure rise rates that corresponds with the plurality of sets of proposed process conditions. This particular method also includes selecting from the plurality of pressure rise rates a sub-plurality of pressure rise rates that allows for a safe operation of the particular chemical process within the particular chemical process plant. This particular method also includes determining for each pressure rise rate within the sub-plurality of pressure rise rates a value of an ancillary parameter for the particular chemical process. The foregoing determining thus provides a sub-plurality of values of the ancillary parameter for the particular chemical process that correspond with the sub-plurality of pressure rise rates. This particular method also includes implementing the particular chemical process within the particular chemical process plant while using a particular set of process conditions from the plurality of sets of proposed process conditions that corresponds with a particular pressure rise rate from the sub-plurality of pressure rise rates that is optimized with respect to a value of the ancillary parameter selected from the sub-plurality of values of the ancillary parameter.

A particular method for safely operating an olefin oxidation chemical process plant in accordance with the invention includes measuring, for each of a plurality of sets of proposed process conditions for an olefin oxidation chemical process within a particular chemical process plant, a pressure rise rate following a deliberate contained ignition of at least one material within the olefin oxidation chemical process. The foregoing measuring thus provides a plurality of pressure rise rates that corresponds with the plurality of sets of proposed process conditions. This particular method also include selecting from the plurality of pressure rise rates a particular pressure rise rate that allows for a safe operation of the olefin oxidation chemical process within the particular chemical process plant. This particular method also includes implementing the olefin oxidation chemical process within the particular chemical process plant while using a particular set of process conditions from the plurality of sets of process conditions that corresponds with the particular pressure rise rate from the plurality of pressure rise rates.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, that form a material part of this disclosure, wherein.

DESCRIPTION OF THE PREFERRED EMBODIMENT

The invention, which includes a method for safely operating a chemical process plant when implementing a chemical process within the chemical process plant, is understood within the context of the description that follows. The description that follows is understood within the context of the drawings described above. The drawings described above are intended for illustrative purposes, and as such the drawings described above are not necessarily drawn to scale.

Figure 1:
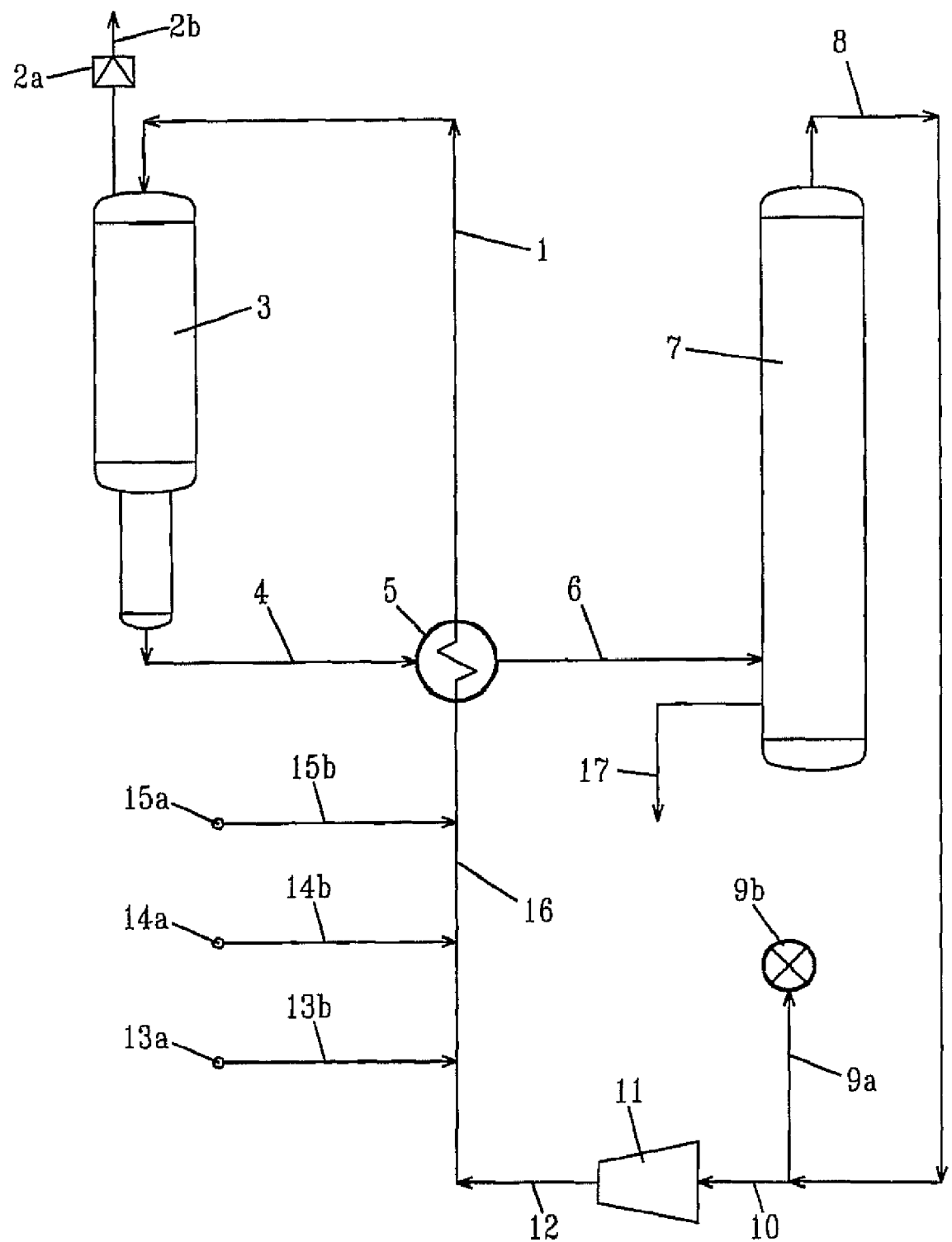
FIG. 1 shows a schematic diagram of a chemical oxidation process plant within which may be implemented, in particular, an ethylene oxidation reaction in accordance with an embodiment of the invention.

FIG. 1 shows a schematic diagram of a particular chemical process plant whose safe operation may be assured in accordance with a method of the invention. The particular chemical process plant whose schematic diagram is illustrated in FIG. 1 is intended as a chemical oxidation process plant that is applicable to, but not necessarily limited to, an olefin oxidation chemical process. More particularly, the olefin oxidation chemical process may also include, but is not necessarily limited to, an ethylene oxidation chemical process that yields an ethylene oxide (i.e., ethylene epoxide) chemical product material from an ethylene reactant material and an oxidant such as but not limited to oxygen.

While FIG. 1 illustrates a chemical process plant (including a chemical reactor) whose safety may be assured when implementing therein a chemical oxidation process such as an olefin oxidation process, and more particularly an ethylene oxidation process, neither the instant embodiment nor the invention is necessarily so limited. Rather, the instant embodiment and the invention are also intended as applicable under circumstances where a pressure rise rate incident to undesirable or unintended ignition of at least one material within a particular chemical process desired to be implemented within a particular chemical process plant (including a particular reactor) may cause for otherwise unsafe operation of the particular chemical process plant.

Thus, in broad terms, the instant embodiment and the invention are applicable for assuring safety within chemical process plants including but not limited to batch chemical process plants and continuous chemical process plants within which may be implemented chemical processes including but not limited to inorganic chemical processes, organic chemical processes and hybrid (i.e., inorganic and organic) chemical processes. Within the context of organic chemical processes, the instant embodiment and the invention may advantageously be practiced within the context of chemical oxidation processes, and more particularly within the context of olefin oxidation processes such as in particular ethylene oxidation processes.

The chemical process plant whose schematic diagram is illustrated in FIG. 1 in a first instance shows: (1) an oxidizable gas 13a that feeds an oxidizable gas feed line 13b; (2) a ballast gas 14a that feeds a ballast gas feed line 14b; and (3) an oxidant gas 15a that feeds an oxidant gas feed line 15b. Each of the oxidizable gas feed line 13b, the ballast gas feed line 14b and the oxidant gas feed line 15b is in turn attached to, and feeds, a manifold 16. In accordance with further discussion below, a recycle gas feed line 12 is also attached to, and also feeds, the manifold 16.

Within the instant embodiment, the oxidizable gas 13a typically comprises an olefin, such as in particular ethylene. However, as noted above, neither the instant embodiment nor the invention is limited to olefin oxidation processes in general, or ethylene oxidation processes more particularly. Rather, the instant embodiment is applicable more generally to: (1) oxidation processes that may include olefin oxidation processes including ethylene oxidation processes; as well as (2) oxidation processes that may include olefin oxidation processes other than ethylene oxidation processes; and (3) oxidation processes other than olefin oxidation processes, where any of the foregoing oxidation processes uses an oxidizable gas.

The ballast gas 14a may include, but is not limited to, any of several ballast gases that are conventional for a particular chemical process that may be implemented within the chemical process plant whose schematic diagram is illustrated in FIG. 1. Such ballast gases are often, but not necessarily exclusively, intended as inert gases with respect to a particular chemical process within which they are employed. Thus, in general ballast gases may include helium, neon, argon, krypton and xenon gases. Within the context of an olefin oxidation reaction, either one of a nitrogen ballast gas and a methane ballast gas is a common ballast gas.

The oxidant gas 13a may comprise any of several oxidant gases that are generally conventional for a particular chemical oxidation process desired to be implemented within the chemical process plant whose schematic diagram is illustrated in FIG. 1. Included in particular are oxygen, ozone, nitrous oxide and nitric oxide oxidant gases. Most particularly common is an oxygen oxidant gas for oxidizing an olefin such as ethylene within an olefin oxidation reaction.

As is illustrated in FIG. 1, the manifold 16 which is connected to and fed by the recycle gas feedline 12, the oxidizable gas feedline 13b, the ballast gas feedline 14b and the oxidant gas feedline 15b, is also connected to a gas-to-gas heat exchanger 5. In general, the manifold 16, as well as the corresponding attached gas feedlines 12/13b/14b/15b connected thereto, are intended to be sized appropriately for a desired production rate of the chemical process plant whose schematic diagram is illustrated in FIG. 1. In turn, the gas-to-gas heat exchanger 5 is also similarly so sized for the desired production rate of the chemical process plant whose schematic diagram is illustrated in FIG. 1.

The materials of construction of the manifold 16, the gas feedlines 12/13a/14a/15a, the gas-to-gas heat exchanger 5 and other components that comprise the chemical process plant that are discussed in further detail below, are also intended to be appropriate for a particular chemical process that is implemented within the chemical process plant whose schematic diagram is illustrated in FIG. 1. Such materials of construction may include, but are not necessarily limited to, any of several metals and metal alloys. For example, and also without limitation, stainless steel alloys are particularly common.

Subsequent to undergoing a heat exchange operation within the gas-to gas-heat exchanger 5 a feed gas mixture generally comprising at least the oxidizable gas 13a, the ballast gas 14a and the oxidant gas 15a are fed through a feed gas supply conduit 1 to reach a reactor and gas cooler 3. At a head of the reactor and gas cooler 3 is a reactor rupture disk 2a that is connected to a reactor vent 2b.

The reactor and gas cooler 3 will typically have located therein a supported catalyst material, such as in particular a microporous catalyst material, that allows for mixing and reaction of the oxidizable gas 13a and the oxidant gas 15a, while the ballast gas 14a serves in a first instance to avoid locally undesirably high concentrations of the oxidizable gas 13a and the oxidant gas 15a within the presence of such a catalyst. Within the context of the instant embodiment when: (1) the oxidizable gas 13a comprises or consists of an olefin such as ethylene; and (2) the oxidant gas 15a consists of or comprises an oxidant such as oxygen, a particular oxidation catalyst material that is not otherwise specifically illustrated in FIG. 1 may often comprise, but will not necessarily comprise, a selective silver catalyst material or a supported selective silver catalyst material.

The reactor rupture disc 2a and the reactor vent 2b are intended to vent (i.e., typically to atmosphere) excess pressure from within the reactor and gas cooler 3. Particular pressure release conditions for the reactor rupture disc 2a are predicated upon a pressure containment rating or a pressure design rating for the reactor and gas cooler 3. Generally, such pressure release conditions are in a range from about 325 to about 450 pounds per square inch, although such specific pressure release conditions for the reactor rupture disc 2a do not limit the embodiment or the invention.

Subsequent to reaction within the reactor and gas cooler 3, a reacted gas stream exits the reactor and gas cooler 3 through a reacted gas conduit 4 attached to the bottom of the reactor and gas cooler 3. In turn, the reacted gas conduit 4 is connected to the gas-to-gas heat exchanger 5 for purposes of cooling the reacted gas stream within the reacted gas conduit 4. Within the context of the instant embodiment when the oxidizable gas 13a comprises in particular ethylene and the oxidant gas 15a comprises in particular oxygen, a reacted gas mixture within the reacted gas conduit 4 comprises ethylene oxide as a desirable reaction product. Also typically included within the reacted gas mixture are: (1) possibly some unreacted reactant ethylene gas and some unreacted oxygen gas; (2) some unreacted nitrogen or some unreacted methane; (3) an undesirable by-product carbon dioxide gas; and (4) argon gas.

A cooled reacted gas mixture exits the gas-to-gas heat exchanger 5 through a cooled reacted gas conduit 6 that in turn enters a wash column 7. Within the wash column 7, the desirable ethylene oxide reaction product is stripped from the cooled reacted gas mixture due to an enhanced solubility of ethylene oxide in water, in comparison with a solubility of at least some other of the cooled reacted gas mixture components in water. A resulting aqueous ethylene oxide solution is removed from the wash column 7 through a tap 17.

The aqueous ethylene oxide solution may be subsequently distilled or otherwise hydrolyzed to provide a purified non-aqueous ethylene oxide reaction product material or ethylene glycols. The remaining gases in the cooled reactant gas mixture that enter the wash column 7 through the cooled reacted gas conduit 6 exit the wash column 7 through an exit gas port that in turn is connected to a recycle gas conduit 8. A certain portion of the remaining gases within the recycle gas conduit 8 may be purged from the recycle gas conduit 8 through a purge valve 9b that is connected to a purge vent 9a that in turn taps into the recycle gas conduit 8. Unpurged portions of the remaining gases within the recycle gas conduit 8 continue through an additional recycle gas conduit 10 that feeds a recycle gas compressor 11. Within the recycle gas compressor 11, the unpurged portions of the remaining gases are in turn recompressed to an appropriate pressure and fed through the recycle gas feed line 12 (that is briefly described above) to the manifold 16 that is described above. These recompressed remaining gases are mixed with the oxidizable gas 13a, the ballast gas 14a and the oxidant gas 15a within the manifold 16 for further processing within the closed loop (i.e., continuous chemical processing) of the chemical process plant whose schematic diagram is illustrated in FIG. 1.

As is understood by a person skilled in the art, after passing through the gas-to-gas heat exchanger 5, the heated recycled gases, along with the heated oxidizable gas 13a, the heated ballast gas 14a and the heated oxidant gas 15a within the feed gas supply conduit 1 and within the reactor and gas cooler 3 may be prone to undesirable reaction that may lead to ignition, combustion, deflagration, detonation or explosion of the foregoing feed gas supply mixture within either the feed gas supply conduit 1 or the reactor and gas cooler 3. To that end the reactor rupture disc 2a is used for purposes of relieving or reducing an undesirable pressure build-up in the reactor and gas cooler 3. Additional rupture discs may also be used within the feed gas supply conduit 1 or in alternative additional locations within the chemical process plant whose schematic diagram is illustrated in FIG. 1, for purposes of relieving or reducing an undesirable pressure build-up.

Within the context of the embodiment and the invention, it is desirable to assure safe operation of the chemical process plant whose schematic diagram is illustrated in FIG. 1, as well as safe operation of other chemical process plants both related and unrelated to the chemical process plant whose schematic diagram is illustrated in FIG. 1. In particular "safe operation" is intended to mean that a chemical process may be implemented within a chemical process plant, such as the chemical process plant whose schematic diagram is illustrated in FIG. 1, absent injury to personnel or damage to the chemical process plant due to undesirable pressure build-up within any of the components that comprise the chemical process plant whose schematic diagram is illustrated in FIG. 1.

In order to provide for the foregoing safe operation of the chemical process plant whose schematic diagram is illustrated in FIG. 1, or any related chemical process plant, the embodiment in a first instance contemplates, but does not necessarily require, the use of a test apparatus. Such a test apparatus is designed to determine a pressure rise rate upon a contained ignition of at least one material used within the chemical process plant whose schematic diagram is illustrated in FIG. 1.

Figure 2:
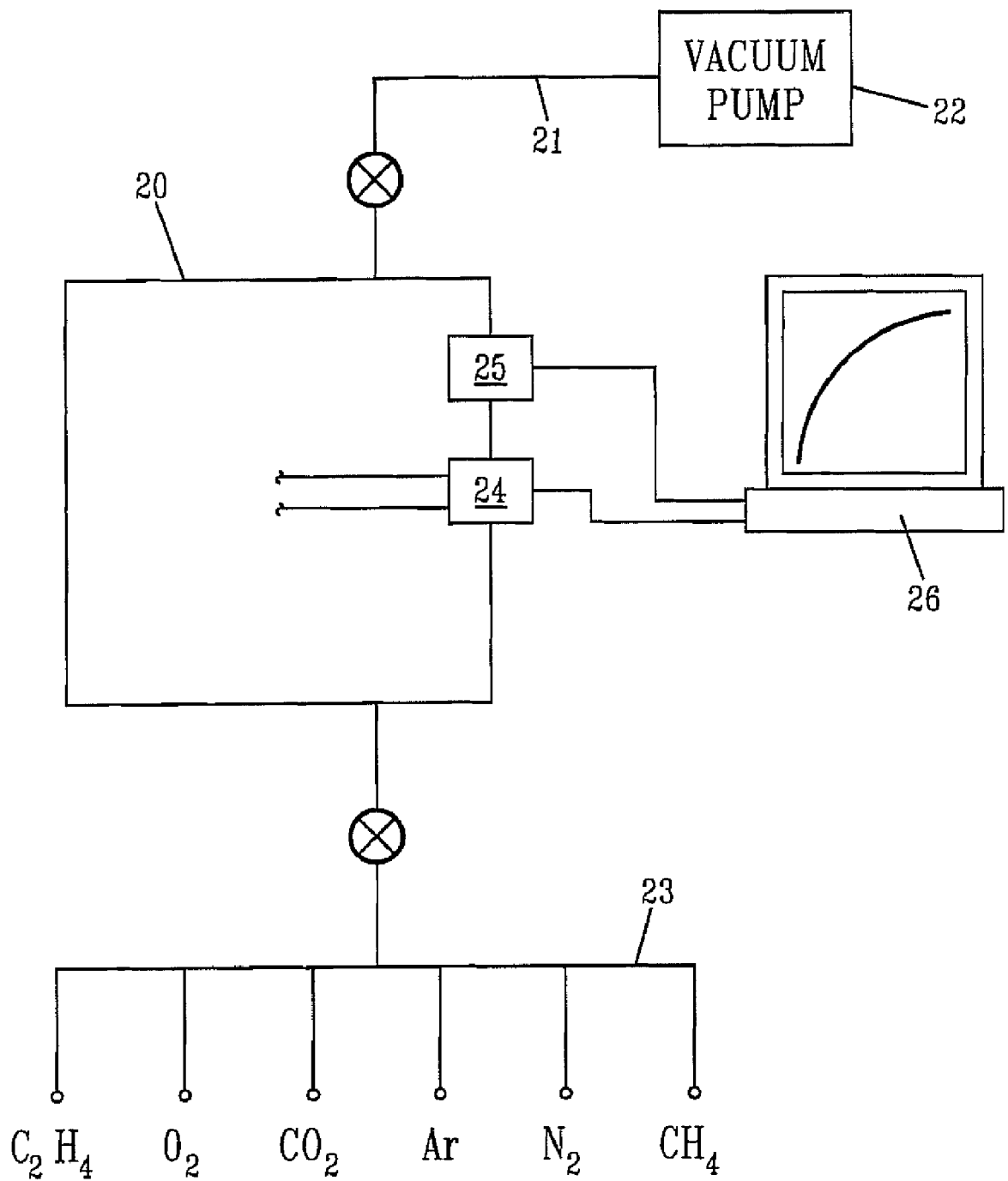
FIG. 2 shows a schematic diagram of a test apparatus that may be used to generate and collect test data in accordance with a method of the invention.

A particular test apparatus that may be used for test purpose in accordance with the instant embodiment is shown in FIG. 2.

FIG. 2 shows a containment vessel 20 attached to a reacted gas conduit 21 that in turn is attached to a vacuum pump 22 that may be used to evacuate the containment vessel 20. Also attached to the containment vessel 20 is a filling manifold 23 to which are connected an ethylene oxidizable gas (i.e., $C_2H_4$), an oxygen oxidant gas (i.e., $O_2$), a carbon dioxide by-product gas (i.e., $CO_2$), an argon impurity gas (i.e., Ar), a nitrogen ballast gas (i.e., $N_2$) and a methane ballast gas (i.e., $CH_4$). FIG. 2 also shows an igniter 24 (i.e., an ignition source) and a pressure transducer 25, each of which penetrates in-part through the containment vessel 20. Finally, each of the igniter 24 and the pressure transducer 25 is electrically connected to a computer 26 for synchronization and data collection purposes. In particular, the computer 26 controls the igniter 24 when igniting the foregoing materials within the containment vessel 20. The computer also monitors a pressure rise within the containment vessel 20 as a function of time subsequent to ignition of at least one of the foregoing materials. Finally, the computer 26 also calculates a maximum pressure rise rate after ignition of the particular gas mixture within the containment vessel 20, although the invention does not preclude alternative methods for determining the maximum pressure rise rate after ignition of the particular gas mixture.

Operation of the test apparatus whose schematic diagram is illustrated in FIG. 2 contemplates that one first charges the containment vessel 20 with a mixture of the reactant gases, byproduct gases, impurity gases and ballast gases at particular concentration levels that are desired to be investigated. After achieving a particular temperature and pressure within the charged containment vessel 20, one then: (1) ignites at least one of the resulting reactant gas, byproduct gas, impurity gas and ballast gas mixture within the charged containment vessel 20 while using the igniter 24; and then (2) measures through the use of the pressure transducer 25 a pressure rise rate (i.e., a rate at which a pressure within the containment vessel 20 increases as a function of time subsequent to ignition). A particular pressure rise rate may be generally measured in pressure units of pounds per square inch pressure, as a function of time units, generally in milli-seconds.

Within the embodiment and within the invention, a pressure rise rate (i.e., in comparison with an absolute pressure or a pressure peak) is deemed as a parameter of interest insofar as very rapid increases in pressure (i.e., higher pressure rise rates) that may not be readily relieved are often more likely to lead to chemical process plant component failure and possible related personal injury, since such very rapid pressure rise rates may not be readily equalized throughout a chemical process plant. In contrast, slower pressure rise rates within the test apparatus, even under certain circumstances where such lower pressure rise rates eventually lead to higher absolute pressures, may under certain circumstances lead to less equipment damage when operating a chemical process plant such as the chemical process plant whose schematic diagram is illustrated in FIG. 1, since explosive damage may more likely result from a very rapid pressure rise rate within a chemical process plant.

Within the context of operation of the test apparatus whose schematic diagram is illustrated in FIG. 2, the instant embodiment first provides for obtaining a plurality of pressure rise rates upon contained ignition of at least one material for a corresponding plurality of sets of proposed process conditions under which one might wish to undertake a particular chemical process within the chemical process plant whose schematic diagram is illustrated in FIG. 1. From the resulting plurality of pressure rise rates that correspond with the plurality of sets of proposed process conditions one can them select a sub-plurality of pressure rise rates that are numerically lower than an arbitrarily determined or engineering designed pressure rise rate safe operation ceiling of a particular chemical process plant within which is intended to implement a particular chemical process for which the plurality of pressure rise rates was measured in a first instance. Finally, having determined a sub-plurality of sets of particular process conditions which might safely be employed for a particular chemical process within a particular chemical process plant, one might then select from the foregoing sub-plurality of safe operating proposed process conditions for the particular chemical process within the particular chemical process plant one particular set of safe operating proposed process conditions that in a second instance leads to an optimal value for at least one ancillary parameter. Such an ancillary parameter might, for example, include a product yield, or alternatively a starting material utilization, or alternatively some other desirable operating parameter for the particular chemical process within the particular chemical process plant.

A particular example of operation of the above described test apparatus that is illustrated in FIG. 2, more specifically within the context of a reaction of ethylene and oxygen to produce ethylene oxide, is provided as follows within the context of the data that is illustrated in Table I.

TABLE 1

PRESSURE RISE RATE TESTS
(at 250° C. & 330 psia)

| TEST EX'MPLE NUMBER | INITIAL CONCENTRATIONS, mole % | | | | BALLAST GAS | MAXIMUM PRESSURE RISE RATE, psi/s |
|---|---|---|---|---|---|---|
| | $C_2H_4$ | $O_2$ | $CO_2$ | AR | | |
| 1 | 20 | 7.2 | 7 | 10 | $N_2$ | 1,636 |
| 2 | 20 | 7.2 | 7 | 10 | $N_2$ | 2,023 |
| 3 | 25 | 8.4 | 1 | 10 | $CH_4$ | 380 |
| 4 | 25 | 8.4 | 7 | 10 | $CH_4$ | 401 |
| 5 | 25 | 9 | 7 | 10 | $CH_4$ | 795 |
| 6 | 25 | 9.5 | 7 | 10 | $CH_4$ | 1,136 |
| 7 | 25 | 8.4 | 15 | 10 | $CH_4$ | 446 |
| 8 | 30 | 6.5 | 1 | 10 | $CH_4$ | 249 |
| 9 | 30 | 7 | 1 | 10 | $CH_4$ | 451 |
| 10 | 30 | 8.4 | 7 | 10 | $CH_4$ | 534 |
| 11 | 35 | 7 | 1 | 10 | $CH_4$ | 200 |
| 12 | 35 | 8 | 7 | 10 | $CH_4$ | 604 |
| 13 | 40 | 7.5 | 1 | 10 | $CH_4$ | 666 |
| 14 | 40 | 8 | 7 | 10 | $CH_4$ | 568 |
| 15 | 40 | 8.4 | 7 | 10 | $CH_4$ | 1,124 |
| 16 | 45 | 7.5 | 1 | 10 | $CH_4$ | 706 |
| 17 | 45 | 8 | 1 | 10 | $CH_4$ | 909 |
| 18 | 45 | 8.4 | 1 | 10 | $CH_4$ | 767 |

TABLE 1-continued

PRESSURE RISE RATE TESTS
(at 250° C. & 330 psia)

| TEST EX'MPLE NUMBER | INITIAL CONCENTRATIONS, mole % | | | | BALLAST GAS | MAXIMUM PRESSURE RISE RATE, psi/s |
|---|---|---|---|---|---|---|
| | $C_2H_4$ | $O_2$ | $CO_2$ | AR | | |
| 19 | 45 | 7.5 | 7 | 10 | $CH_4$ | 648 |
| 20 | 45 | 8 | 7 | 10 | $CH_4$ | 1,281 |
| 21 | 45 | 8.4 | 7 | 10 | $CH_4$ | 1,701 |
| 22 | 50 | 6.5 | 1 | 10 | $CH_4$ | 399 |
| 23 | 50 | 7 | 1 | 10 | $CH_4$ | 551 |
| 24 | 50 | 7 | 1 | 10 | $CH_4$ | 506 |
| 25 | 50 | 7.5 | 1 | 10 | $CH_4$ | 980 |
| 26 | 50 | 8 | 1 | 10 | $CH_4$ | 1,195 |
| 27 | 50 | 8.4 | 1 | 10 | $CH_4$ | 1,005 |
| 28 | 50 | 7 | 7 | 10 | $CH_4$ | 1,516 |
| 29 | 50 | 7.5 | 7 | 10 | $CH_4$ | 2,332 |
| 30 | 50 | 8 | 7 | 10 | $CH_4$ | 2,504 |
| 31 | 50 | 8.4 | 7 | 10 | $CH_4$ | 2,925 |

Table I illustrates the maximum pressure rise rates for a series of thirty-one test examples that were undertake for plausible and proposed chemical process conditions for the above described ethylene oxide production reaction that primarily involves a chemical oxidation reaction of ethylene with oxygen. Particular process conditions included different concentrations (i.e., measured in mole percent) of an ethylene reactant gas, an oxygen oxidant gas, a carbon dioxide byproduct gas and an argon impurity gas. Within test example 1 and test example 2, a nitrogen ballast gas was used as a ballast to provide a 100 mole percent test mixture. Within test example 3 through test example 31 a methane ballast gas was used as a ballast to provide a 100 mole percent test mixture.

Other constant parameters within the series of thirty-one test examples prior to ignition included: a containment vessel 20 (and contained reactant materials) temperature of 250 degrees centigrade and a containment vessel 20 (and contained reactant materials) total pressure of about 330 pounds per square inch above atmospheric. Ignitions of each of the proposed test example mixtures within each of the test examples 1-31 were undertaken using a spark source as the igniter 24. Pressure rises were measured over a time period of about 2 to 3 seconds while using the pressure transducer 25. A maximum pressure rise rate for each of the test examples 1-31 was determined as a mathematical asymptote.

As is illustrated by the data within Table I, the use of nitrogen as a ballast gas for an ethylene oxide production reaction apparently in general leads to higher pressure rise rates in comparison with the alternative use of methane as a ballast gas. A molecular basis for understanding this particular observation is not known with certainty, and for that reason speculation as to the underlying cause for this observation is not intended. Otherwise, the maximum pressure rise rate data that are illustrated in FIG. 1 also appear to illustrate a dependence of maximum pressure rise rate upon ethylene, oxygen and carbon dioxide concentration, with a particularly strong dependence upon oxygen concentration.

Predicated upon the above observations, one might expect that an ethylene oxide production process that is safely undertaken within a chemical process plant such as the chemical process plant that is illustrated in FIG. 1 may in general correspond with test example 27, where a high ethylene concentration and a high oxygen concentration may be expected to provide a high yield of ethylene oxide, but a low carbon dioxide by-product concentration provides for a comparatively low maximum pressure rise rate.

The preferred embodiment and test examples of the invention are illustrative of the invention rather than limiting of the invention. Revisions and modifications may be made to particular chemical process plants and particular chemical processes intended to be implemented therein, while still providing a method for safely operating a chemical process plant in accordance with the invention, further in accordance with the accompanying claims.

What is claimed is:

1. A method for safely operating a chemical process plant comprising:
   measuring, for each of a plurality of sets of proposed process conditions for a particular chemical process within a particular chemical process plant, a pressure rise rate following a deliberate contained ignition of at least one material within the particular chemical process, to provide a plurality of pressure rise rates that corresponds with the plurality of sets of proposed process conditions, wherein said plurality of sets of proposed process conditions includes employing a same initial reaction pressure and temperature for each set, while varying concentration of at least one reactant gas used for the particular chemical process in each set;
   selecting from the plurality of pressure rise rates a particular pressure rise rate that allows for a safe operation of the particular chemical process within the particular chemical process plant; and
   implementing the particular chemical process within the particular chemical process plant while using a particular set of process conditions from the plurality of sets of reactor conditions that corresponds with the particular pressure rise rate from the plurality of pressure rise rates.

2. The method of claim 1 wherein the chemical process plant comprises a batch chemical process plant.

3. The method of claim 1 wherein the chemical process plant comprises a continuous chemical process plant.

4. The method of claim 1 wherein the particular chemical process comprises an organic chemical process.

5. The method of claim 4 wherein the organic chemical process comprises an oxidation process.

6. The method of claim 1 wherein the particular chemical process comprises an inorganic chemical process.

7. The method of claim 1 wherein the deliberate contained ignition and the measuring of the pressure rise rate is undertaken using a test apparatus separate from the particular chemical process plant.

8. A method for safely operating a chemical process plant comprising:
   measuring, for each of a plurality of sets of proposed process conditions for a particular chemical process within a particular chemical process plant, a pressure rise rate following a deliberate contained ignition of at least one material within the particular chemical process, to provide a plurality of pressure rise rates that corresponds with the plurality of sets of proposed process conditions, wherein said plurality of sets of proposed process conditions includes employing a same initial reaction pressure and temperature for each set, while varying concentration of at least one reactant gas used for the particular chemical process in each set;
   selecting from the plurality of pressure rise rates a sub-plurality of pressure rise rates that allows for a safe operation of the particular chemical process within the particular chemical process plant;
   determining for each pressure rise rate within the sub-plurality of pressure rise rates a value of an ancillary parameter for the particular chemical process, to thus provide a sub-plurality of values of the ancillary parameter for the particular chemical process that correspond with the sub-plurality of pressure rise rates; and implementing the particular chemical process within the particular chemical process plant while using a particular set of process conditions from the plurality of sets of proposed process conditions that corresponds with a particular pressure rise rate from the sub-plurality of pressure rise rates that is optimized with respect to a particular value of the ancillary parameter selected from the sub-plurality of values of the ancillary parameter.

9. The method of claim 8 wherein the chemical process plant comprises a batch chemical process plant.

10. The method of claim 8 wherein the chemical process plant comprises a continuous chemical process plant.

11. The method of claim 8 wherein the particular chemical process comprises an organic chemical process.

12. The method of claim 11 wherein the organic chemical process comprises an oxidation process.

13. The method of claim 8 wherein the particular chemical process comprises an inorganic chemical process.

14. The method of claim 8 wherein the deliberate contained ignition and the measuring of the pressure rise rate is undertaken using a test apparatus separate from the particular chemical process plant.

15. A method for safely operating an olefin oxidation chemical process plant comprising:

measuring, for each of a plurality of sets of proposed process conditions for an olefin oxidation chemical process within a particular chemical process plant, a pressure rise rate following a deliberate contained ignition of at least one material within the olefin oxidation chemical process, to provide a plurality of pressure rise rates that corresponds with the plurality of sets of proposed process conditions, wherein said plurality of proposed process conditions includes employing a same initial reaction pressure and temperature for each set, while varying concentration of at least one reactant gas used for the particular chemical process in each set;

selecting from the plurality of pressure rise rates a particular pressure rise rate that allows for a safe operation of the olefin oxidation chemical process within the particular chemical process plant; and implementing the olefin oxidation chemical process within the particular chemical process plant while using a particular set of process conditions from the plurality of sets of process conditions that corresponds with the particular pressure rise rate from the plurality of pressure rise rates.

16. The method of claim 15 wherein the olefin oxidation reaction comprises an ethylene epoxidation reaction.

17. The method of claim 15 wherein the selecting provides a sub-plurality of pressure rise rates that allow for safe operation of the olefin oxidation chemical process within the particular chemical process plant.

18. The method of claim 17 further comprising determining for each pressure rise rate within the sub-plurality of pressure rise rates a value of an ancillary parameter for the olefin oxidation chemical process, to thus provide a sub-plurality of values of the ancillary parameter for the olefin oxidation chemical process that correspond with the sub-plurality of pressure rise rates.

19. The method of claim 18 wherein the implementing the olefin oxidation chemical process within the particular chemical process plant uses a particular set of process conditions from the plurality of sets of proposed process conditions that corresponds with a particular pressure rise rate from the sub-plurality of pressure rise rates that is optimized with respect to a particular value of the ancillary parameter selected from the sub-plurality of values of the ancillary parameter.

* * * * *